United States Patent
Hu et al.

(10) Patent No.: US 10,506,449 B1
(45) Date of Patent: Dec. 10, 2019

(54) MODELING WIRELESS SIGNAL STRENGTH WITHIN A DEFINED ENVIRONMENT

(71) Applicant: BAYLOR UNIVERSITY, Waco, TX (US)

(72) Inventors: Jonathan Hu, Woodway, TX (US); Liang Dong, Woodway, TX (US); Yang Li, Waco, TX (US)

(73) Assignee: Baylor University, Waco, TX (US)

( * ) Notice: Subject to any disclaimer, the term of this patent is extended or adjusted under 35 U.S.C. 154(b) by 0 days.

(21) Appl. No.: 16/001,415

(22) Filed: Jun. 6, 2018

(51) Int. Cl.
 *H04W 16/22* (2009.01)
 *H04B 17/391* (2015.01)

(52) U.S. Cl.
 CPC .......... *H04W 16/22* (2013.01); *H04B 17/391* (2015.01)

(58) Field of Classification Search
 None
 See application file for complete search history.

(56) References Cited

U.S. PATENT DOCUMENTS

2009/0195461 A1   8/2009   Hirt

FOREIGN PATENT DOCUMENTS

WO   2015097482 A1   7/2015
WO   2016067017 A1   5/2016

OTHER PUBLICATIONS

"Effect of interference from cellular telephones on aircraft avionic equipment", Civil Aviation Authority, Aviation House, West Sussex RH6 0YR, Apr. 30, 2003, 30 pages, England.

"Interference levels in aircraft at radio frequencies used by portable telephones", Civil Aviation Authority, May 2, 2000, 14 pages, England.

Armstrong, N.L., Antar, Y.M.M., "Investigation of the electromagnetic interference threat posed by a wireless network inside a passenger aircraft", IEEE Transactions on Electromagnetic Compatibility, May 2008, pp. 277-284, vol. 50, No. 2.

Ross, E., "Personal Electronic Devices and Their Interference With Aircraft Systems", NASA/CR-2001-210866, Jun. 2001, 28 pages.

Strauss, B., Morgan, M.G., Apt, J., Stancil, D.D., "Unsafe at any Airspeed? Cellphones and other electronics are more of a risk than you think", https://spectrum.ieee.org/aerospace/aviation/unsafe-at-any-airspeed, Mar. 1, 2006, 10 pages, vol. 43, Issue 3.

(Continued)

*Primary Examiner* — Hong S Cho
(74) *Attorney, Agent, or Firm* — Jackson Walker, LLP

(57) ABSTRACT

A disclosed system quantifies the power distribution of a wireless signal within a constrained environment using non-sequential ray tracing. For each ray, one or more ray-reflecting surface is prescreened to identify collision-eligible surfaces and identify a collision surface from the collision-eligible surfaces, wherein the collision surface is the first ray-reflecting surface that a ray collides with. A power distribution component, indicating the position and power of a ray at a particular elevation within the environment, is added to a cumulative power distribution. If a reflected ray corresponding to each collision is calculated and satisfies ray eligibility conditions, a collision surface may be determined for the reflected ray. Collision surfaces may be identified by evaluating a target function for a number of ray positions, where the target function evaluates to zero when displacement between the ray and the ray-reflecting surface is zero.

20 Claims, 8 Drawing Sheets

(56) References Cited

OTHER PUBLICATIONS

"Passenger electronic devices", NASA ASRS Database Report Set, TH: 262-7, Jan. 2017, 114 pages.

Ely, J.J., Nguyen, T.X., Koppen, S.V., Beggs, J.H., "Wireless Phone Threat Assessment and New Wireless Technology Concerns for Aircraft Navigation Radios",NASA/TP-2003-212446, Jul. 2003, 198 pages.

De Santis, V., Feliziani, M., Ocera, G., "Revealing System of GSM Mobile Phone Operations aboard Aircraft", International Symposium on Electromagnetic Compatibility-EMC Europe, 2008, 6 pages, IEEE 978-1-4244-2737-6.

Nunes, R.R., Schuur, J.,"Investigation of the Performance of Antennas for Interference Detection in Aircraft" 7th European Conference on Antennas and Propagation (EUCAP), 2013, 5 pages, IEEE 978-88-907018-3-2/13.

Woods, R., Ely, J.J., Vahala, L., "Detecting the use of Intentionally Transmitting Personal Electronic Devices Onboard Commercial Aircraft", IEEE Int. Symp. Electromagn. Copmat-0-7803-7835-0/03, Aug. 2003, pp. 263-268, vol. 1.

Casewell, I.E., "The Provision of GSM Cellular Radio Environments Within Passenger Aircraft Operating Over Europe", 5th International Conference on Mobile Radio and Personal Communications, 1989, pp. 172-176.

Jahn, A., Holzbock, M., Muller, J., Kebel, R., De Sanctis, M., Rogoyski, A., Trachtman, E., Franzrahe, O., Werner, M., Hu, F., "Evolution of Aeronautical Communications for Personal and Multimedia Services" IEEE Communications Magazine, Jul. 2003, pp. 36-43, vol. 1.

Miguelez, C.G., "GSM Operation Onboard Aircraft", ETSI White Paper, No. 4, Jan. 2007, 18 pages.

Pereira, F., Theis, C. Moreira, A., Ricardo M., "Evaluating Location Fingerprinting Methods for Underground GSM Networks deployed over Leaky Feeder", IEEE, 2001, 6 pages.

Zhang, Y. P., "Practical Performance of Digital Cellular System in Mass Rapid Transit Environments", International Journal of Communication Systems, 2005, pp. 143-157, vol. 18, No. 2.

Spencer, G.H., Murty, M.V.R.K., "General Ray-Tracing Procedure", Journal of the Optical Society of America, Jun. 1962, pp. 672-678, vol. 52, No. 6.

Debono, C.J., Farrugia, R.A., Chetcuti, K., "Modelling of the Wireless Propagation Characteristics inside Aircraft", Aerospace Technologies Advancements, 2010, pp. 361-378.

Kuper, T.G., "Optical Design With Nonsequential Ray Tracing", Proc. SPIE 1013, Optical Design Methods, Applications and Large Optics, Apr. 13, 1989, pp. 42-50.

Hecht, E., "Optics", Pearson Education, Inc., 2017.

Morgan, S.P., "Prediction of Indoor Wireless Coverage by Leaky Coaxial Cable Using Ray Tracing",IEEE Transactions on Vehicular Technology, Nov. 1999, pp. 2005-2014, vol. 48, No. 6.

Pedrotti, F.L., Pedrotti, L.S., Pedrotti, L.M., "Introduction to Optics", pp. 9-13, Pearson; 3 Ed., 2006.

"Improve In-Flight Connectivity to Wireless Networks", https://www.gore.com/sites/g/files/ypyipe116/files/2016-05/GORE_Leaky_Feeder_Antennas_2013.pdf, 2013, 4 pages.

Brown, B., "Toward a Bigger, Faster, Denser Wi-Fi World", https://www.networkworld.com/article/3191186/wi-fi/toward-a-bigger-faster-denser-wi-fi-world.html, Apr. 20, 2017, 8 pages.

Bryan, V., "In-Flight Wi-Fi Market Heats up as Satellite Services Come Online", https://www.reuters.com/article/us-airlines-wifi-satellite/in-flight-wi-fi-market-heats-up-as-satelitte-servicescome-online-idUSKCN0X8200, Apr. 11, 2016, 7 pages.

Hoa, K., "Inflight Wifi will be Everywhere in 20 Years and it's Going to Make Airlines a lot of Money", https://qz.com/1087705/in-flight-wifi-has-the-potential-to-create-a-130-billion-global-market-within-the-next-two-decades/, Sep. 26, 2017, 9 pages.

Ransom, L., "Thales is on the March In Hotly Competitive IFEC Market", https://runwaygirlnetwork.com/2014/04/30/thales-is-on-the-march-in-hotly-competitive-ifec-market/, Apr. 30, 2014, 5 pages.

"Thales IFEC Activities Reshaped to Become Thales InFly Experience", https://www.thalesgroup.com/en/worldwide/aerospace/event/thales-ifec-activities-reshaped-become-thales-inflyt-experience, Apr. 14, 2015, 9 pages.

Durston, J., "Inside the Billion-Dollar, Super-Censored Inflight Movie Industry", http://www.cnn.com/travel/article/secrets-of-in-flight-movies/index.html, Aug. 25, 2014, 8 pages.

Nguyen, T.X., Koppen, S.V., Smith, L.J., Williams, R.A., Salud, M. T. "Wireless Phone Threat Assessment for Aircraft Communication and Navigation Radios", pp. 135-140, Nov. 2018.

"North America IFEC System (in Flight Entertainment & Communications) Market", http://www.micromarketmonitor.com/market/north-america-ifec-system-in-flight-entertainment-communications-9428301506.html, 3 pages, Nov. 2018.

"Asia-Pacific IFEC System (In Flight Entertainment & Communications) Market", http://www.micromarketmonitor.com/market/asia-pacific-ifec-system-in-flight-entertainment-communications-1755859626.html, 3 pages, Nov. 2018.

"Europe IFEC System (In Flight Entertainment & Communications) Market", http://www.micromarketmonitor.com/market/europe-ifec-system-in-flight-entertainment-communications-9925487366.html, 3 pages, Nov. 2018.

Jaskolski, J., International Search Report for International Patent Application No. PCT/US2019/035369, dated Aug. 22, 2019, European Patent Office.

Jaskolski, J., Written Opinion for International Patent Application No. PCT/US2019/035369, dated Aug. 22, 2019, European Patent Office.

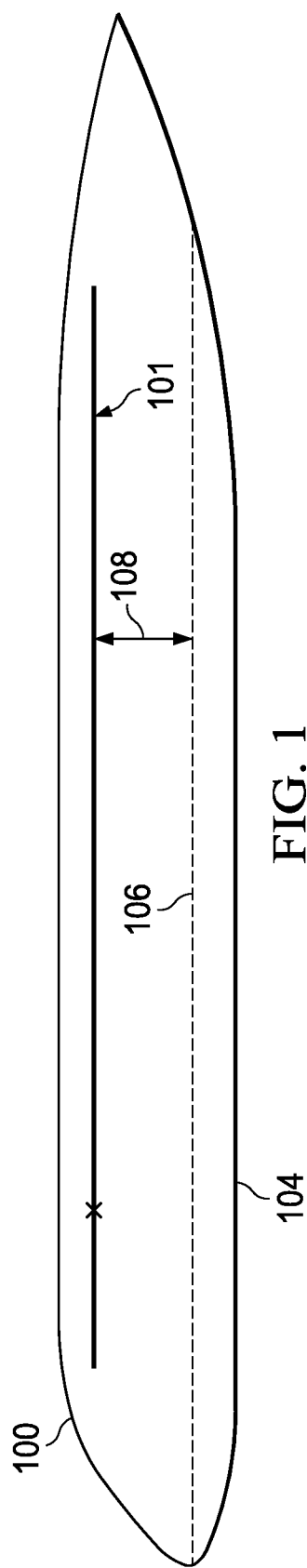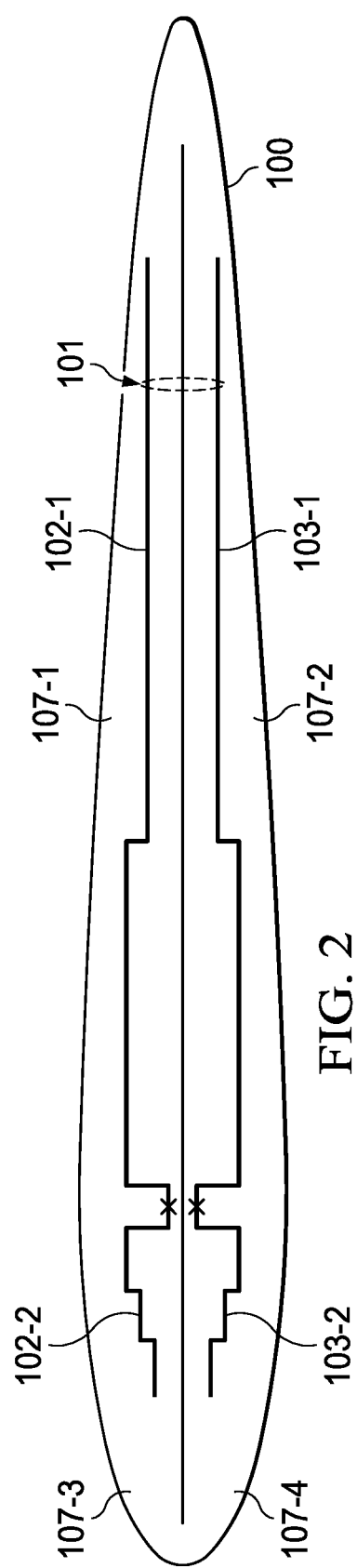

MODELING WIRELESS SIGNAL STRENGTH WITHIN A DEFINED ENVIRONMENT

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

Field of the Invention

Disclosed subject matter pertains to wireless communication and, more particularly, modeling of wireless signal power distributions within specific environments.

Related Art

Many commercial airlines offer in-flight wireless access networks, including some form of IEEE 802.11 (WiFi) network, that permit passengers to access Internet content in flight. However, ever increasing passenger demand for uninterrupted internet access via connections capable of supporting data intensive applications including, as non-limiting examples, high definition video and audio signals remains largely unaddressed.

Demand is also increasing for high performance, in-flight mobile communication services capable of supporting, as a non-limiting example, an in-flight call, made by a passenger while in the passenger's seat using the passenger's mobile device, to a landline or mobile phone on the ground. Currently, cellular communication during flight is often restricted or prohibited for safety reasons because electromagnetic interference (EMI) associated with the cellular communication signals transmitted by most mobile devices can interfere with electronic devices on an aircraft. However, because it is extremely easy to activate a cellular phone, whether intentionally or accidently, and extremely difficult for a crew member to detect, mobile phones can be a source of flight safety concern.

Whether to identify the source of a particular cellular communication signal or to provide broadband wireless access to hundreds of closely spaced mobile devices, an understanding of the power distribution of electromagnetic signals within an enclosed, densely populated environment characterized by a large number of discontinuities, including chairs, overhead cabinets, etc., is needed.

BRIEF SUMMARY OF THE INVENTION

Subject matter included herein discloses a method and system for determining wireless signal power distribution within an enclosed environment such as the interior of an aircraft cabin. Embodiments may employ a non-sequential ray tracing technique to model signal power distribution within an aircraft cabin equipped with a leaky antenna array. Disclosed methods and systems may model wireless signal coverage inside the aircraft cabin, taking into consideration various parameters such as the dimensions and materials of the aircraft cabin itself as well as the chairs, overhead storage bins, and other structures within the cabin. Embodiments may also model the power distribution attributable to wireless communication signals transmitted by the mobile devices of one or more passengers to monitor electromagnetic interference or to model the signal power distribution for wireless signals transmitted from the leaky antenna array. Although disclosed subject matter emphasizes an aircraft cabin environment, disclosed methods and systems are applicable to other enclosed or specialized environments including, as non-limiting examples, tunnels, buildings, ships, and trains.

Although descriptions of disclosed systems and methods may include references to WiFi signals or networks, WiFi is a non-limiting example of a wireless signal for which a power distribution within an enclosed environment such as an aircraft cabin is modeled. Accordingly, disclosed subject matter encompasses modeling of the power distributions for other wireless signals including, as a non-limiting example, cellular communication signals including, without limitation, global system for mobile communication (GSM) signals and the like. Currently, the use of cellular communication devices is frequently restricted or entirely prohibited on board an aircraft, primarily due to electromagnetic interference (EMI) concerns. However, developing technologies for suppressing or containing GSM-induced EMI may pave the way for in-flight cellular communication services and such services may employ a leaky feeder antenna to provide reliable connectivity. Thus, disclosed systems and methods for characterizing the signal power distribution associated with a particular antenna within a particular enclosed environment may be beneficially employed to implement and optimize onboard wireless network systems enabling airborne passengers to use their mobile devices to text or call people on the ground or otherwise communicate from within the enclosed environment. In this respect, disclosed systems and methods might be employed not only to characterize and optimize the desired GSM signal, but also to characterize and minimize any associated EMI signals.

Disclosed methods include methods performed by a central processing unit (CPU) executing executable instructions stored in a suitable memory devices or storage device. Disclosed embodiments include embodiments incorporating methods and operations that improve performance with little or no loss of accuracy.

Disclosed methods and systems quantify a power distribution for a wireless communication signal within a constrained environment that includes a leaky antenna array with a plurality of antenna slots. For each slot, operations referred to herein as surface selection operations are performed on each propagation ray of a ray tracing model that includes a plurality of propagation rays representing the radiation pattern of each antenna slot. In at least one embodiment, the surface selection operations performed for each propagation ray include screening ray-reflecting surfaces to identify collision-eligible surfaces and collision-ineligible surfaces. The collision-eligible surfaces are then processed to identify a collision surface for the ray. A reflected ray resulting from the propagation ray colliding with the collision surface is identified. If the reflected ray meets one or more criteria including, as a non-limiting example, sufficient power intensity, the surface selection operations are performed on the reflected ray to identify a collision surface for the reflected ray and to identify a subsequent reflected ray where each subsequent reflected has less lower power than its predecessor. This process continues until the power of a reflected ray is below a threshold value or until some other one or more criteria are not met. A signal power component is determined for each propagated and reflected ray where the signal power component may indicate a power and position of the ray as the ray intersects with a particular plane, such as a passenger level plane, within the enclosed environment. The accumulation of the signal distribution components from each the rays and reflected rays represents the signal power distribution.

In accordance with disclosed subject matter, a system and method for quantifying a power distribution of a wireless communication signal within a constrained environment includes performing particular operations for each of one or more antenna slots of a leaky antenna disposed within a constrained environment. Performing the particular operations may include performing surface selection operations for each propagation ray in a ray tracing model of each antenna slot wherein the ray tracing model includes a plurality of propagation rays.

The surface selection operations may include screening one or more ray-reflecting surfaces with respect the propagation ray to identify collision-ineligible surfaces and collision-eligible surfaces. A collision surface may then be determined from the collision-eligible surfaces, wherein the collision surface comprises a first ray-reflecting surface with which the propagation ray collides. A power distribution component corresponding to the propagation ray may be added to a cumulative power distribution. The power distribution component may indicate the position and power of the propagation ray as the ray intersects the passenger level plane or some other plane of interest.

One or more parameters of a reflected ray resulting from the propagation ray colliding with the collision surface may then be calculated or otherwise determined. The reflected ray parameters may include, as non-limiting examples, a power parameter and directional parameter. To illustrate, the power of a reflected ray may be determined based, at least in part, on the power of the propagation ray, the propagation ray's angle of incidence with respect to the collision surface, and an attenuation factor assigned to the collision surface. If the parameters of the reflected ray satisfy each of one or more ray eligibility criteria, the reflected ray is treated as a new propagation ray and processed in the same manner as its predecessor, i.e., the propagation ray whose collision with the collision surface resulted in the reflected ray, to determine a power distribution component and a collision surface for the reflected ray. This process may be repeated until, eventually, a reflected ray has insufficient power or fails to satisfy one or more of the ray eligibility criteria.

Screening a ray-reflecting surface may include identifying the ray-reflecting surface as either a collision-eligible surface or a collision-ineligible surface based on an original position of the propagation ray, a velocity vector or another indicator of a direction of motion of the propagation ray, and a surface displacement indicative of a position of the ray-reflecting surface relative to the original position of the propagation ray.

Identifying a ray-reflecting surface as either a collision-eligible or a collision-ineligible surface may include comparing one or more coordinates of a velocity vector for the propagation ray to a corresponding one or more coordinates of the displacement vector for the ray-reflecting surface. In at least one embodiment, if sign consistency is detected between each of the one or more coordinates of the velocity vector and its corresponding one or more coordinates of the displacement vector, the ray-reflecting surface is identified as collision-eligible surface.

In alternative embodiments, identifying ray-reflecting surfaces may include defining an eligible surfaces volume based on an initial position of the propagation ray and an enclosing volume wherein the enclosing volume is of a size sufficient to enclose the enclosed environment. The eligible surfaces volume may comprises a cuboid wherein a diagonal of the cuboid extends from the initial position of the propagation ray to an intersection point, wherein the intersection point is the point at which the propagation ray intersects the enclosing volume.

Identifying the collision surface may include identifying the collision surface using a target function that determines a target function value indicative of a displacement between a propagation ray and a ray-reflecting surface. The target function may evaluate to zero when displacement between the propagation ray and the ray-reflecting surface is zero and the target function value may increase monotonically with increasing displacement.

In an exemplary embodiment, a ray-reflecting surface corresponds to a triangle ABC defined by points A, B, and C, the position of the propagation ray comprises a point O, and the target function receives A, B, C, and O as inputs. In at least one embodiment, the target function evaluates to (S1+S2+S3)−S0 wherein S0 represents an area of triangle ABC, S1 represents an area of a triangle OAB defined by points O, A, and B, S2 represents an area of a triangle OBC defined by points O, B, and C, and S3 represents an area of a triangle OCA defined by points O, C, and A.

Exemplary operations for identifying the collision surface may include calculating initial slopes of target function plots for each collision-eligible surface, where each target function plot comprises a plot of target function values versus propagation ray positions. Ray-reflecting surfaces associated with positive value initial slopes may be identified as collision-ineligible surfaces and discarded from further processing. For each collision-eligible surface remaining after said identifying, each target function plot may be extrapolated in accordance with its initial slope to identify a projected distance value for each collision-eligible surface. The collision-eligible surfaces may be ordered in accordance with the projected distance values, e.g., surface associated with lowest projected distance value is processed first or otherwise prioritized. Processing a collision-eligible surface may include calculating a minimum target function value for the collision-eligible surface and, responsive to detecting a minimum target function value greater than zero, identifying the surface as a collision-ineligible surface and discarding the surface from further consideration with respect to the current propagation ray. Responsive to detecting a minimum target function value of zero, the ray-reflecting surface may be identified as the collision surface for the corresponding propagation ray.

BRIEF DESCRIPTION OF THE SEVERAL VIEWS OF THE DRAWINGS

Drawings are not to scale unless stated so. Embodiments of methods, systems, and/or articles of manufacture disclosed herein are described with reference to the following figures, in which like reference numerals indicate like elements unless indicated otherwise and in which a hyphenated form of reference numeral indicates an instance of the corresponding element, which may also be referenced generically or collectively with an un-hyphenated form of the reference numeral. e.g., "... a first widget 11-1 and a second widget 11-1 ... wherein each widget 11 includes ... and wherein widgets 11 further include ..."

FIG. 1 illustrates a side view of an aircraft cabin including a leaky antenna array;

FIG. 2 illustrates a top view of the aircraft cabin of FIG. 1;

DETAILED DESCRIPTION

Figure 3:
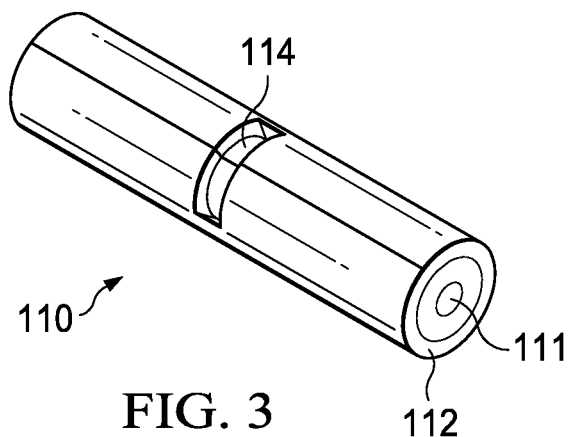
FIG. 3 illustrates a section of a leaky antenna including a leaky antenna slot.

The figures referenced above and the written description of specific structures and functions below are not presented to limit the scope of what the Applicant has invented or the scope of the appended claims. Rather, the figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present disclosure will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation location and vary from time to time. While a developer's efforts might be complex and time-consuming in an absolute sense, such efforts would be, nevertheless, a routine undertaking for those of ordinary skill in this art having benefit of this disclosure. It must be understood that the inventions disclosed and taught herein are susceptible to numerous and various modifications and alternative forms. The use of a singular term, such as, but not limited to, "a," is not intended as limiting of the number of items. Further, the various methods and embodiments of the system can be included in combination with each other to produce variations of the disclosed methods and embodiments. Discussion of singular elements can include plural elements and vice-versa. References to at least one item or to one or more items may refer to one item or to multiple items. Also, various aspects of the embodiments could be used in conjunction with each other to accomplish any disclosed objectives, advantages, or benefits. Unless the context requires otherwise, the term "comprise" or variations such as "comprises" or "comprising," should be understood to imply the inclusion of at least the stated element or step or group of elements or steps or equivalents thereof, and not the exclusion of a greater numerical quantity or any other element or step or group of elements or steps or equivalents thereof. The device or system may be used in a number of directions and orientations. The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

FIG. 1 is a side view and FIG. 2 is a top view of a leaky antenna array 101 deployed within an aircraft cabin 100. The leaky antenna array 101 illustrated in FIG. 1 and FIG. 2 is disposed substantially along or within a substantially horizontal plane disposed above a passenger level elevation 106. The vertical displacement 108 between the elevation of leaky attention array 101 and the passenger level elevation 106 may be, as one example, 1.85 meters. In other embodiments, vertical displacement 108 may be greater than or less than this displacement.

The passenger level elevation 106 may represent the height or elevation above a base elevation or floor 104 at which a mobile device of a passenger is most likely disposed when the passenger is seated. By way of a non-limiting example, the passenger level elevation 106 may lie within a range of elevations between a first elevation corresponding to the elevation of the seating surface of a passenger seat and a second elevation corresponding to an elevation of an upper end of a seat back that defines an operational regime for a typical passenger or other user of wireless signals.

The leaky antenna array 101 illustrated in FIG. 2 includes leaky antenna section 102 and leaky antenna section 103, wherein each leaky antenna section 102 includes one or more segments of varying lengths. As illustrated in FIG. 2, leaky antenna section 102-1 is disposed in a first section 107-1 of aircraft cabin 100, leaky antenna section 103-1 is disposed in second section 107-2 of aircraft cabin 100, leaky antenna section 102-2 is disposed in third section 107-3 of aircraft cabin 100, and leaky antenna section 103-2 is disposed in fourth section 107-4, where sections 107 of aircraft cabin 100 may be defined by walls and/or other structures.

Leaky antenna array 101, also sometimes referred to as a leaky feeder or leaky feeder antenna, is a communication system device suitable for use within enclosed environments including tunnels, mines, aircraft, and the like. A leaky antenna may include a coaxial cable in which slots or slots have been incorporated into the outer conductor along the length of the cable. The slots allow electromagnetic signals to leak into and out of the cable. Line amplifiers may be employed at regular intervals within the cable to maintain signals at functional levels.

The leaky antenna array 101 illustrated in FIG. 2 includes a first leaky antenna 102 and a second leaky antenna 103. A first section 102-1 of leaky antenna 102 is disposed in a right rearward section 107-1 of aircraft cabin 100, a second section 102-2 of leaky antenna 102 is disposed in a right forward section 107-3 of aircraft cabin 100, a first section 103-1 of leaky antenna 103 is disposed in a left rearward forward section 107-3 of leaky antenna array 101, and a second section 103-2 of leaky antenna 103 is disposed in a left forward section 107-4 of aircraft cabin 100.

Although FIG. 2 illustrates a leaky antenna array 101 that includes two leaky antennas (102, 103), each of which includes two or more straight line segments, other embodiments may include more or fewer leaky antennas and each leaky antenna may include more or fewer straight line segments. In still other embodiments, the leaky antenna array 101 may include a leaky antenna with one or more curved sections (not depicted in FIG. 1 or FIG. 2).

FIG. 3 illustrates an exemplary section of a leaky antenna 110 suitable for use as a leaky antenna section 102 in the leaky antenna array 101 illustrated in FIG. 1 and FIG. 2. The leaky antenna 110 illustrated in FIG. 3 comprises a co-axial cable including co-centric conductors, each of which is comprised of an electrically conductive element, compound, or material. The co-centric conductors of the illustrated leaky antenna 110 include an inner conductor 111 and an outer conductor 112. Outer conductor 112 defines or includes a leaky antenna slot 114 that permits electromagnetic signals to enter and exit leaky antenna 110. Although FIG. 3 illustrates a short span of leaky antenna 110 that includes just a single leaky antenna slot 114, leaky antenna slots 114 may be disposed at various positions along leaky antenna 110.

The leaky antenna 110 may be treated, in at least some embodiments, as an ideal or near-ideal Lambert surface for purposes of modeling its characteristic radiation pattern. The power or intensity of radiation from an ideal Lambert source is directly proportional to the cosine of the angle between the direction of the outgoing light and the surface normal. Treating the leaky antenna 110 of FIG. 3 as a Lambert source is reasonable because the electromagnetic waves originate predominantly from one side of the leaky antenna 110 in the configuration of leaky antenna array 101 illustrated in FIG. 1 and FIG. 2. Nevertheless, in at least some embodiments, far field electromagnetic behavior can be used to approximate the radiation pattern associated with leaky antenna 110. The power of far field radiation varies inversely with the square of the distance from the antenna or other object of interest. Thus, for example, if the far field power is P at a distance of 1 unit from an antenna or other object of interest the power at a distance of 2 units is ¼×P.

Figure 4:
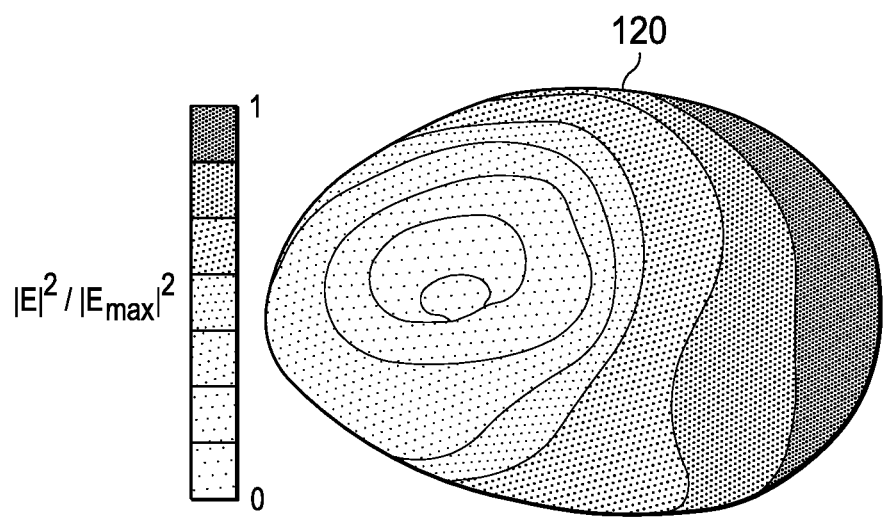
FIG. 4 illustrates a far field radiation pattern associated with the leaky antenna of FIG. 3.

FIG. 4 illustrates a graphical representation of an exemplary far field intensity pattern 120 corresponding to at least one embodiment of the leaky antenna 110 illustrated in FIG. 4. Disclosed embodiments may use ray tracing to determine wireless signal power distribution in an enclosed environment such as the environment within aircraft cabin 100 (FIG. 1). As its name suggests, ray tracing models electromagnetic wave propagation as a plurality of propagation rays where each propagation ray is perpendicular to the wave front of propagation and points in the direction of energy flow. Ray tracing models are most accurate when the object-to-wavelength ratio, i.e., a ratio of the smallest dimension of ray-reflecting objects located within the applicable environment relative to the wavelength of the applicable wireless signal is an order of magnitude or more. Using GSM communication as an example, the carrier signal frequency of 1.88 GHz corresponds to a wavelength of approximately 0.1 m, which is roughly the diameter of a golf hole. For this signal, ray tracing may be used with a high degree of accuracy for environments, such as an aircraft cabin, in which all or most of the physical dimensions of interest are 1 meter or greater.

Ray tracing algorithms include sequential and non-sequential algorithms. A sequential ray tracing algorithm traces rays through a pre-defined sequence of surfaces while travelling from the object surface to the image surface. Sequential ray-tracing may yield insight into curvatures, ideal glass types, and number of lens elements required in an optical system. However, for a complex system such as the system represented by the surfaces within an aircraft cabin, analysis of the wireless signals inside an airplane, the order in which rays scatter and interact with objects depends on the relative direction and location of the ray. Accordingly, a non-sequential ray tracing algorithm may be preferred to determine wireless signal power distribution within an aircraft cabin or within other geometrically large and complex environments.

Figure 5:
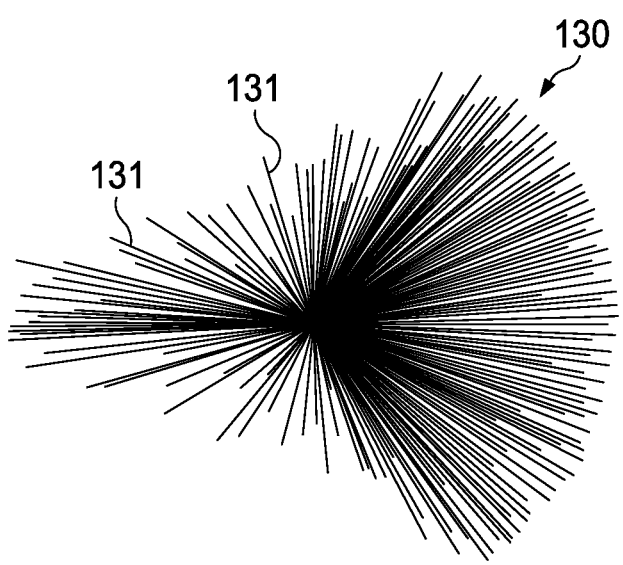
FIG. 5 illustrates a ray tracing model of the radiation pattern of FIG. 4.

FIG. 5 illustrates an exemplary ray tracing model 130, including a plurality of propagation rays 131, corresponding to and generated based on the far field intensity pattern 120 illustrated in FIG. 4. In at least one embodiment, ray tracing model 130 includes N propagation rays 131 wherein the direction of each propagation array 131 is chosen by random selection. Other embodiments, may employ a different technique for converting a radiation pattern to a ray tracing model.

The value of N, the number of propagation rays 131, necessary to accurately represent the corresponding radiation pattern and accurately predict the resulting signal power distribution varies depending upon the application. Generally, the value of N should be the smallest value that produces accurate results. This value of N, which may be referred to herein as Nmin, may be determined empirically by observing changes in predicted power distributions for different values of N. In at least one embodiment, Nmin may be defined as the least value of N for which a 10% increase in N results in less than 1% change in predicted power distribution. Other embodiments may employ more relaxed or more stringent conditions for convergence.

Ray tracing model 130 may be represented as a data structure that includes an entry associated with each propagation ray 131. Each entry in such a data structure may include sufficient fields to fully describe each propagation ray 131. These fields may include, as non-limiting examples, three or more fields uniquely defining an orientation for each propagation ray 131, one or more fields for indicating a magnitude of each propagation ray 131. In at least some embodiments, the data structure may be simplified by an assumption that all propagation rays 131 in ray tracing model 10 originate from the same point of origin, in which case the orientation and magnitude may be conveyed by a single set of three parameters corresponding to three dimensions, whether specified using a Cartesian coordinate system, a polar coordinate system, or another suitable system. In at least some embodiments, the data structure corresponding to the ray tracing model 130 illustrated in FIG. 5 is provided from a manufacturer or distributor of the leaky antenna 110. In other embodiments, the data structure for ray tracing model 130 may be derived from the far field intensity pattern 120 illustrated in FIG. 4.

The accuracy of alternative models of electromagnetic propagation, including the finite element method (FEM) or finite-difference time-domain (FDTD) method in which antenna signals are treated as electromagnetic waves, depends on the mesh size being much smaller than the applicable wavelength. Such methods often require a comparatively large amount of computer memory and computational time to compute, which make them unrealistic to model wireless signals in an airplane. In contrast, ray tracing models require much less computer resources and achieves reliable results in a relatively short period of time.

Rays from different slots along leaky antenna array 101 undergo reflection and refraction as they impinge on surfaces of the cabin and structures within the aircraft cabin. In at least one embodiment, refracted rays are ignored without substantial loss of accuracy because the applicable surfaces, i.e., the surfaces of the aircraft shell and aircraft furniture have high attenuation and very low refraction.

In at least one embodiment, rays are maintained and propagated until either of two ray termination criteria has been satisfied. The two ray termination criteria may include a propagation length criteria and a power level criteria. The propagation length criteria may be configured to terminate a ray after the ray and its ancestors have an accumulated propagation distance exceeding a particular propagation distance, e.g., 60 M or longer. The power level criteria may terminate any reflected ray with a power intensity that is 10% or less of the initial intensity of the original ray.

The final result is a data structure that maps or otherwise indicates power levels at different positions within the passenger level elevation 106 inside aircraft cabin 100, which represents an estimate of the wireless communication signal power available to passengers for their personal mobile devices.

Figure 6:
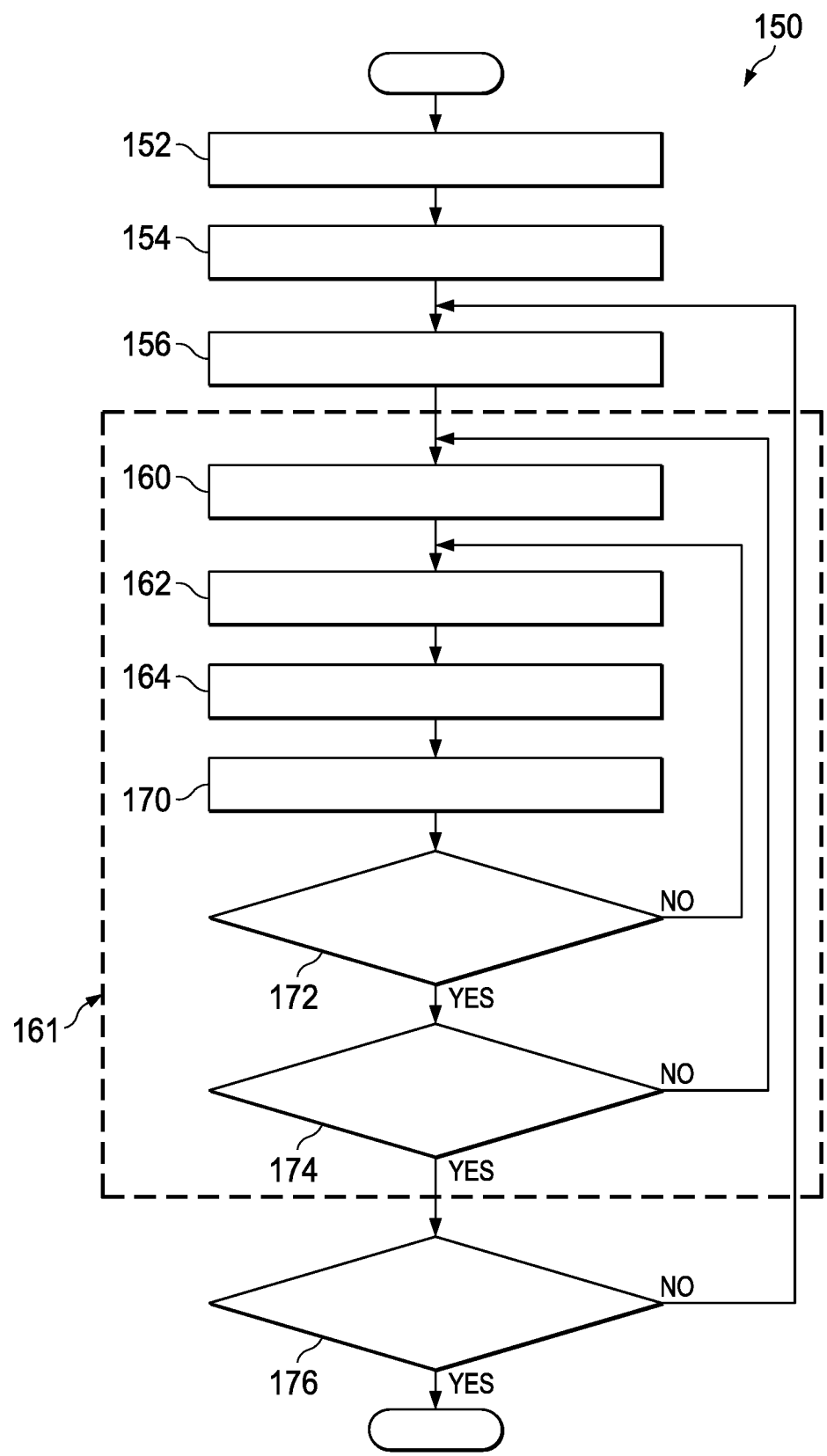
FIG. 6 illustrates a flow diagram of a ray tracing method for modeling the power distribution of a wireless signal.

FIG. 6 illustrates a flow diagram of an exemplary method 150 for determining, modeling, or estimating a signal power distribution (SPD) for a communication signal within an enclosed environment, such as the aircraft cabin 100 illustrated in FIG. 1, that includes a leaky antenna array such as the leaky antenna array 101 illustrated in FIG. 1. The method 150 illustrated in FIG. 6 includes flow diagram elements corresponding to various operations and such operations may be performed by a general purpose computer programmed with a computer program comprising a plurality of computer executable programming instructions. The general purpose computer may include a CPU or another suitable type of general purpose or application specific processor and one or more computer storage devices accessible to the CPU. The computer storage devices may include a volatile or non-volatile storage device or memory device in which all or some of the programming instructions may be stored. A general purpose computer suitable for performing method 150 is illustrated in FIG. 18 and described in the corresponding text.

Generally, the method 150 illustrated in FIG. 6 performs operations that may include collision surface selection operations and reflected-ray operations for each propagation ray in an applicable ray tracing model and for each slot in a leaky antenna array. The collision surface selection operations may determine the first ray-reflecting surface that a propagation ray will collide with as well as the point and angle of the collision. The reflected ray operations identify a reflected ray resulting from each ray-to-surface collision and determine whether the intensity of the reflected ray is sufficient to include in the SPD determination. One or more configurations settings associated with method 150 may include one or more attenuation parameters that determine, in conjunction with one or more intensity criteria, whether a reflected ray is to be further processed or discarded. Eventually, the intensity of a reflected ray will be insufficient to satisfy the applicable intensity criteria and the ray reflected will be discarded before loading the next ray from the ray tracing model.

A power value is determined for each propagation ray and for each reflected ray of sufficient intensity. The individual power values are summed or otherwise grouped, combined, or accumulated to produce the SPD. In some embodiments, each power level value represents a power level at a particular elevation within the enclosed environment. As a non-limiting example, at least one embodiment produces a passenger level SPD, i.e., an SPD based on the power value calculated for each ray as it passes through the passenger level 106 (FIG. 1).

In some embodiments, method 150 is simplified by constraining an elevation parameter to a single value or to a comparatively small number of values representing some fraction of the total elevation of the aircraft cabin 100. As suggested previously, for example, the SPD at passenger level elevation 106 may be thought of as the most useful SPD within the aircraft cabin 100 illustrated in FIG. 1. Accordingly, one or more embodiments of method 150 may generate a planar SPD representing the power intensity levels at a plurality of points, each of which lies within a plane disposed at the passenger level elevation 106 illustrated in FIG. 1. Other embodiments may generate SPDs covering the entire interior aircraft cabin 100 while still other embodiments may generate intermediate SPDs covering less than the entire aircraft cabin 100 but more than the SPD at a single elevation.

The flow diagram blocks of the method 150 illustrated in FIG. 6, correspond to various operations described herein and include a data retrieval block (block 152) corresponding to operations for retrieving certain data described below, an initialization block (block 154) corresponding to operations for configuring the system performing method 150, a slot selection block (block 156) corresponding to operations for selecting a leaky antenna slot, a ray processing block (block 161) corresponding to operations for processing propagation rays associated with the leaky antenna slot as described below, and a remaining slots block (block 176) corresponding to an operation for determining whether any leaky antenna slots remain.

The ray processing block 161 illustrated in FIG. 6 may be performed for each propagation ray in a ray tracing model of the applicable leaky antenna slot. The illustrated ray processing block 161 includes a ray launching block (block 160) corresponding to operations for selecting one of the propagation rays of the applicable ray tracing model, a surface filtering block (block 162) corresponding to operations for identifying surfaces that are collision-ineligible with respect to the propagation ray being processed, a surface identification block (block 164) for identifying the current propagation ray's collision surface, a power and angle determination block (block 170) for determining a power and angle of a reflected ray resulting the propagation ray's collision with the collision surface, a reflected ray criteria block (block 172) for distinguishing between reflected rays that should be further processed and reflected rays that require no further processing, and a remaining rays block (block 174) for determining whether each propagation ray in the ray tracing model have been processed.

The method 150 illustrated in FIG. 6 loads, retrieves, obtains, or otherwise accesses (block 152) one or more data structures. In at least one embodiment, the first data structure is an environment geometry file corresponding to and indicative of the physical geometry of the applicable environment. In the case of an enclosed environment corresponding to the aircraft cabin 100 of FIG. 1, the environment geometry file is indicative of the physical geometry of aircraft cabin 100. A second data structure that may be input as part of block 152 illustrated in FIG. 6 is a ray source file, which is a data structure corresponding to the ray tracing model 130 illustrated in FIG. 5. A third data structure input, which may be referred to herein as a material data structure, is indicative of the location, size, and material or composition of the physical structures within the interior of the applicable environment.

After loading the applicable data structures in block 152, the method 150 illustrated in FIG. 6 initializes (block 154) one or more system parameters pertaining to the particular computing system performing method 150. A leaky antenna slot may then be selected (block 156) from a plurality of leaky antenna slots defined for a particular leaky antenna array 101. Each leaky antenna slot may be defined by its latitudinal and longitudinal coordinates as seen from the top view of FIG. 2, as well as its height or elevation within aircraft cabin 100. A leaky antenna data structure that includes the position information for each leaky antenna slot may be loaded as a fourth input in block 152.

Once a leaky antenna slot is identified, the method 150 illustrated in FIG. 6 executes a ray processing loop 161 for each propagation ray 131 (FIG. 5) in ray tracing model 130 (FIG. 4). The ray processing loop 161 illustrated in FIG. 6 includes operations 160, 162, 164, 170, 172, and 174 as described herein.

The environment geometry file and the material file may include data defining hundreds or thousands of surfaces within aircraft cabin 100. The block 162 illustrated in FIG. 6 comprises a surface filtering operation to reduce the number of surfaces used in the determination of a collision surface, i.e., the first surface that a propagation ray collides with. Aspects of particular operations encompassed by surface filtering block 162 are discussed in more detail with respect to FIG. 12 through FIG. 16.

After filtering at least some surfaces in surface filtering block 162, the method 150 illustrated in FIG. 6 performs a surface selection block 164 to identify the surface with which the propagation ray under consideration first collides. This surface may be referred to herein as the first collision surface or, more simply, the collision surface associated with the propagation ray. Operations for identifying each propagation ray's collision surface are described in more detail below with respect to FIG. 9.

Once the collision surface for a ray has been identified, an angle and power may be determined (blocks 170) for the reflected ray produced by the collision of the original ray and the collision surface. The direction of the reflected ray can be determined by reflection law, and the reflection coefficient can be calculated according to Fresnel's equation. One or more attenuation factors may be stipulated and used to determine an intensity associated with the reflected ray. The method 150 illustrated in FIG. 6 may employ one or more intensity criteria and/or minimum intensity thresholds. If the intensity of a reflected ray is less than the minimum intensity threshold, as determined in block 172, the reflected ray is effectively discarded and method 150 as illustrated in FIG. 6 proceeds to block 174. However, if the intensity of the reflected ray is sufficient to satisfy any one or more intensity thresholds or criteria, the method 150 illustrated in FIG. 6 performs operations 162, 164, and 170 for the reflected ray.

When the intensity of a reflected ray fails to satisfy any intensity criteria, method 150 determines (block 174) whether every propagation ray in the ray tracing model has been processed for the current antenna slot. If any propagation rays associated with the present antenna slot have not been processed, method 150 performs operations 160 through 172 for the next propagation ray. If every propagation ray has been processed for the current antenna slot, processing of the current antenna slot is complete and method 150 proceeds to block 176 to determine whether any other antenna slots remain. If method 150 determines in block 176 that all antenna slots have been processed, method 150 terminates. Otherwise, method 150 performs operations 156 through 174 for the next antenna slot.

As stated above, surface selection block 164 finds the collision surface for a particular ray, i.e., the first surface with which a particular ray collides as the ray propagates forward over time. In at least one embodiment, identification of the collision surface associated with a particular propagation ray is facilitated by employing a target function F, as described herein, that generates a value indicative of the displacement between a propagation ray and a surface.

Figure 7:
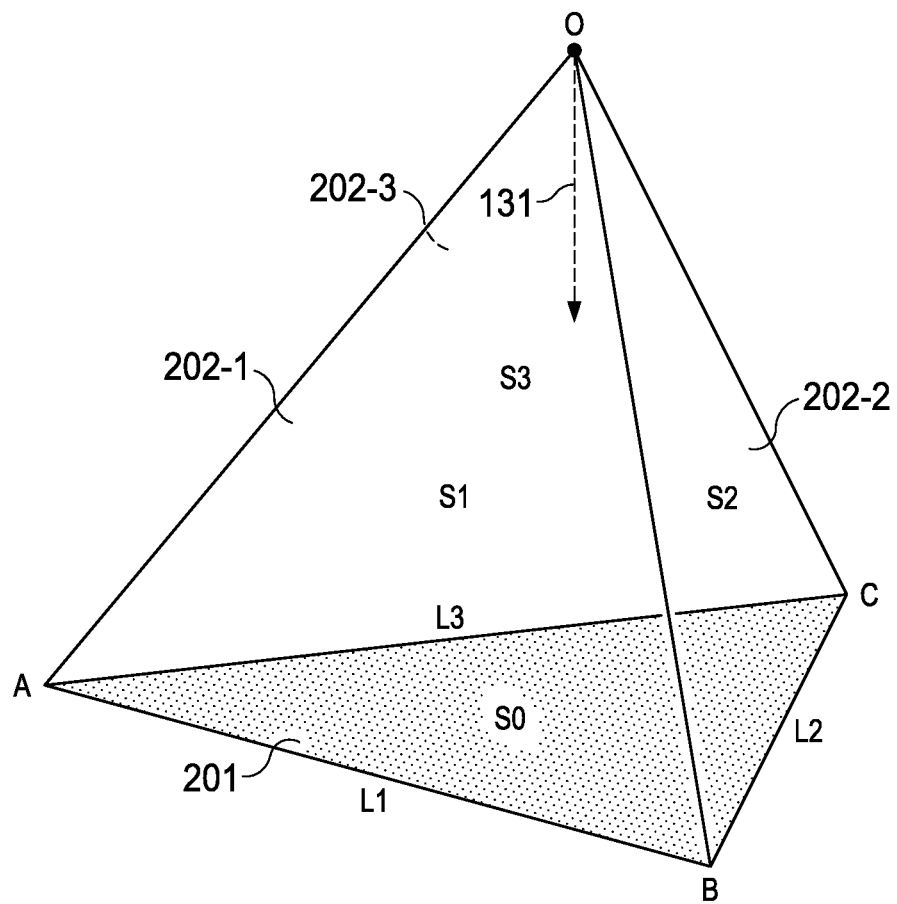
FIG. 7 is a graphical representation of a propagation ray propagating towards a triangle ABC, which represents a portion of a ray-reflecting surface.
Figure 8:
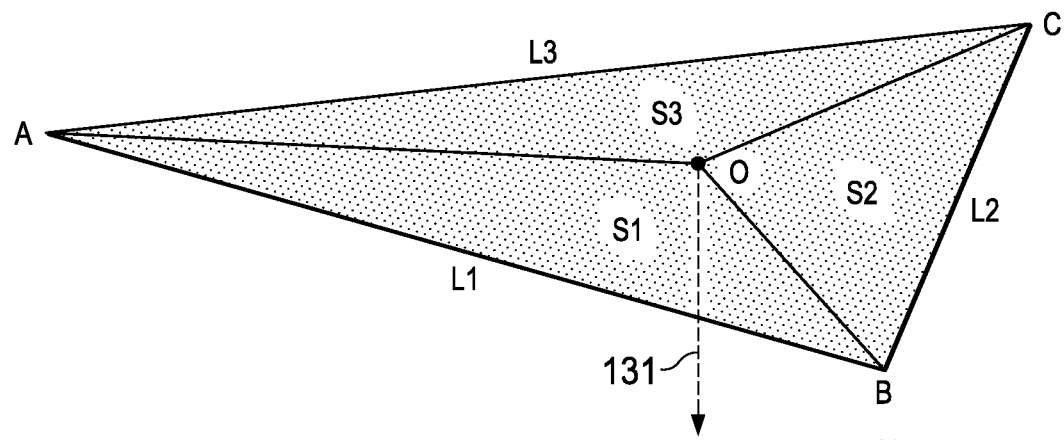
FIG. 8 is a graphical representation of the propagation ray of FIG. 7 as it collides with the ray-reflecting surface.

Referring to FIG. 7 and FIG. 8, a propagation ray 131 and an exemplary surface 201 are depicted at two points in time to illustrate the target function F. Each surface in the environment geometry file and the material file corresponds to a triangle defined by three points in space. An exemplary surface 201, most clearly shown in FIG. 7, corresponds to a triangle of area S0 defined by points A, B, and C and consisting of line segments L1, between points A and B, L2 between points B and C, and L3, between points C and A. In FIG. 7, the origin point O of propagation ray 131 is displaced from and propagating towards surface 201 while, in FIG. 8, origin point O of propagation ray 131 has reached and collided with surface 201. In FIG. 7, the origin point O of propagation ray 131, forms a first triangular surface 202-1 with points A and B, a second triangular surface 202-2, with points B and C, and a third triangular surface 202-3, with points A and C.

In at least one embodiment, the target function F(A,B,C, O) is defined as:

$$F(A,B,C,O)=(S1+S2+S3)-S0$$

where S1 is the area of triangle OAB, S2 is the area of triangle OBC, S3 is the area of triangle OCA, and S0 is the area of triangle ABC. FIG. 8 suggests that the target function F(A,B,C,O) evaluates to zero when 0 lies in the surface 201 corresponding to triangle ABC, i.e., S1+S2+S3=S0 if and only if the distance between point O and surface 201 is zero. In terms of the target function F, the collision surface for a propagation ray is the first surface that produces a target function value of zero as the ray propagates. Accordingly, one embodiment of surface selection block 164 (FIG. 6) finds the first surface whose target function F evaluates to zero as the propagation ray 131 propagates forward.

Figure 9:
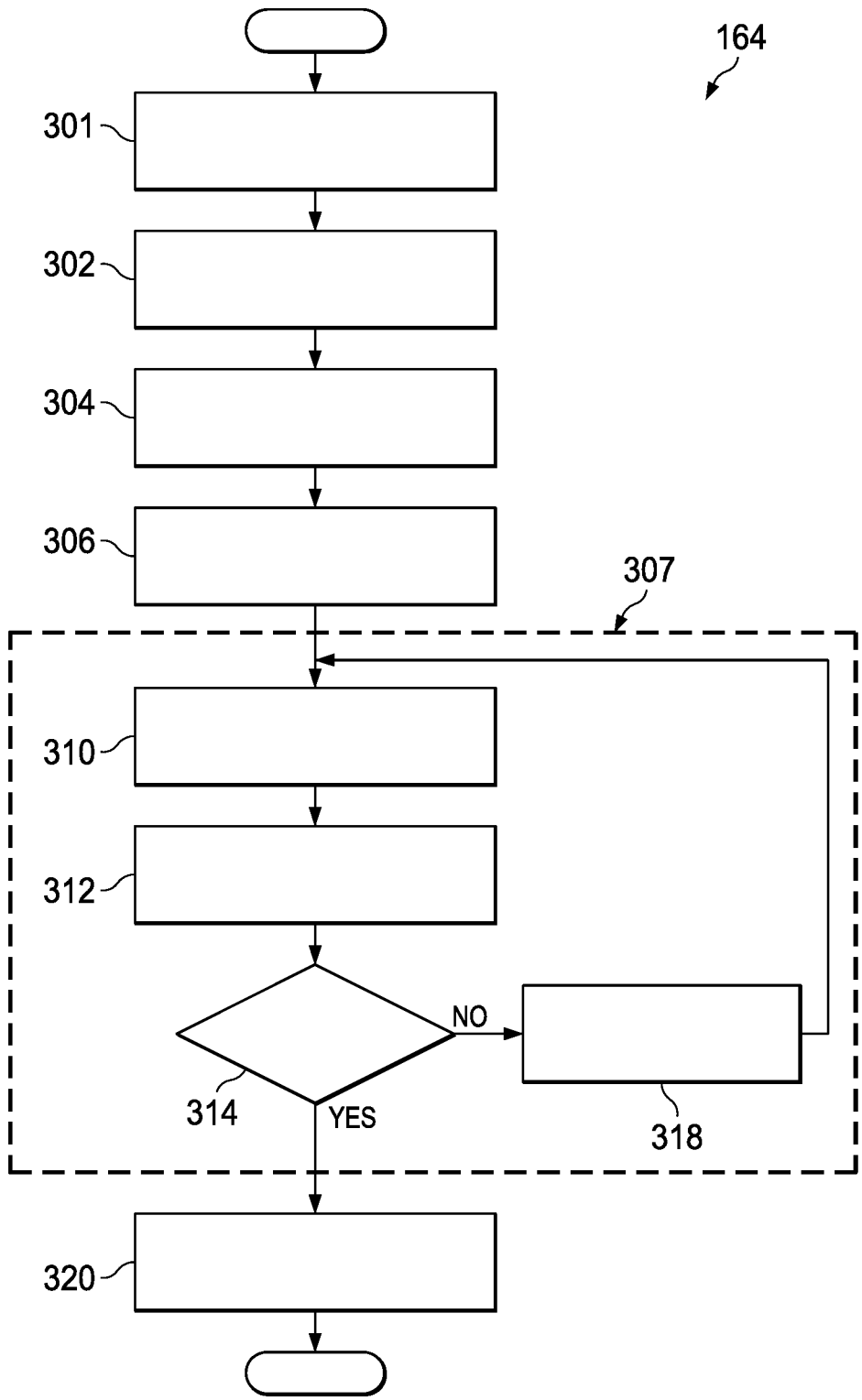
FIG. 9 illustrates a flow diagram of method for identifying a collision surface.

FIG. 9 illustrates a flow diagram of an exemplary surface selection block 164 for determining the collision surface of a propagation ray 131 (FIG. 5) or the collision surface of a reflected ray.

The flow diagram blocks illustrated in FIG. 9, correspond to various operations described herein and include an initial slope block (block 301) for determining an initial slope of a target function plot for a collision-eligible surface, a filtering block (block 302) for discarding certain surfaces based on their initial slopes, an estimation block (block 304) for estimating a collision distance for a particular surface, a prioritizing block (block 306) corresponding to operations for sorting or otherwise processing collision-eligible surfaces, a simulation loop block (block 307) for determining a target function minimum for the current surface, and an identification block (block 320) for identifying the collision surface for the present propagation ray.

The simulation loop block 307 illustrated in FIG. 9 includes a selection block (block 310) for selecting the collision-eligible surface with the shortest estimate collision distance, a minimum target function value block (block 312) for calculating the minimum target function value of the current propagation ray with respect to the current collision-eligible surface, a decision block (block 314) for determining whether the minimum target function value is zero (0), and a discard block (block 318) for discarding surfaces that yield minimum target function values greater than 0.

Figure 10:
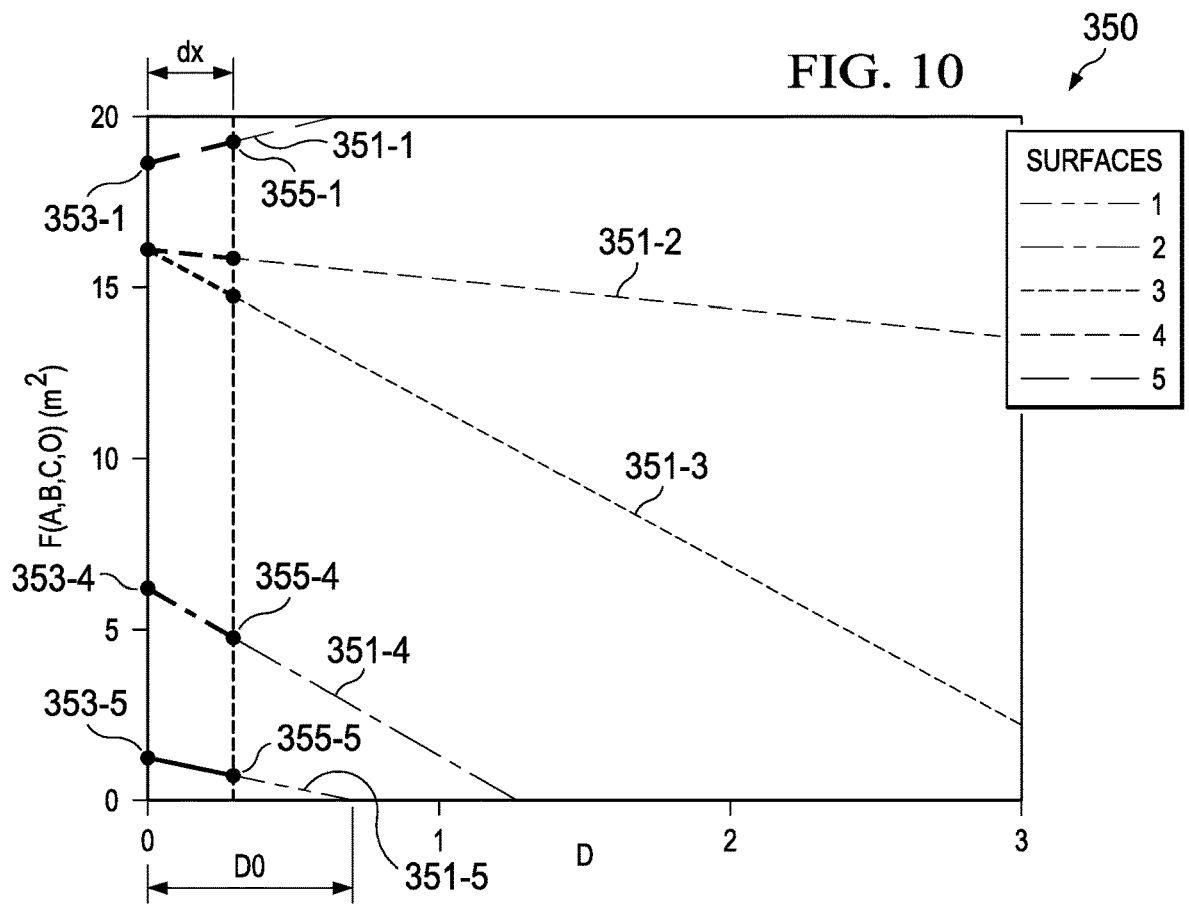
FIG. 10 illustrates target function values plotted for each of a small number of. collision-eligible ray-reflecting surfaces.

The surface selection block 164 illustrated in FIG. 9 begins by calculating (block 301) initial slopes of target function plots associated with each collision-eligible surface, i.e., each surface that remains after the prescreening of surfaces performed in surface filtering block 162 (FIG. 6). FIG. 10 illustrates target function plots 351 for each of five collision-eligible surfaces, while in actual practice, the number of collision-eligible surfaces is likely to be significantly larger. Each target function plot 351 graphs the target function value F(A,B,C,O) of a propagation ray vs a distance parameter D representing the distance the propagation ray has traveled from its original position. An initial slope of each target function plot 351 is determined by calculating the target function difference, which corresponds to the difference between the propagation ray's initial target function value 353, i.e., the propagation ray's target function value at D=0, and the propagation ray's delta target function value 355, i.e., the propagation ray's target function value at D=dx, where dx is a small value. In one exemplary embodiment, a value equal to 10% of the applicable wavelength is used for dx. Other embodiments may, however, use larger or smaller values. The slope of the line connecting each initial target function value 353 and its corresponding delta target function value 355 represents the initial target function slope.

Returning to FIG. 9, each collision-eligible surface whose target function plot exhibits a positive initial slope is discarded (block 302) because a positive slope indicates that the corresponding propagation ray is moving away from the applicable surface. Referring to the exemplary set of target function plots 351 in FIG. 10, the surface associated with target function plot 351-1 can be eliminated as a collision surface candidate because the initial slope of target function plot 351-1 is positive, i.e., the distance between the ray and the surface associated with target function plot 351-1 increases as the ray propagated away from its original position.

The surface selection block 164 illustrated in FIG. 9 includes calculating (block 304) a distance, referred to herein as the collision distance estimate D0, where D0 represents the value of D at which a linear extrapolation of the target function plot 351 intersects the D axis of plot 350, i.e., the distance at which the target function value reaches zero along the linear extrapolation of the line between the initial target function value 353 and the corresponding delta target function value 355.

The collision surface candidates, i.e., all collision-eligible surfaces remaining after discarding surfaces in block 302, are then prioritized or sorted (block 306) according to their collision distance estimates D0. The surface selection block 164 illustrated in FIG. 9 then begins to execute a loop 307 in which the collision surface candidate having the lowest collision distance estimate D0 is selected (block 310) for ray propagation simulation.

Ray propagation simulation for the selected surface is then performed by calculating a target function value for incremental positions of the applicable ray to identify (block 312) a minimum target function value, Fmin, for the selected surface. Because the target function value decreases monotonically as a propagation ray approaches a particular surface and increases monotonically once the propagation ray collides with or passes by the particular surface, Fmin is the last target function value calculated before an increase in target function value is detected. Thus, if a sequence of incremental distances for a propagation ray is denoted as D(1), D(2), . . . , D(n−1), D(n), . . . , then:

$$F\text{min}=F(A,B,C,D(x)) \text{ where } F(A,B,C,D(x-1))>F(A,B,C,D(x))<F(A,B,C,D(x+1))$$

Once Fmin is identified, the surface selection block 164 illustrated in FIG. 9 determines (block 314) whether Fmin equals zero is made. If the Fmin for a selected surface is zero, the selected surface is identified as the collision surface (block 320). Conversely, if Fmin is positive, the propagating ray did not collide with the selected surface and the selected surface may be discarded (block 318) as a collision surface candidate.

Figure 11:
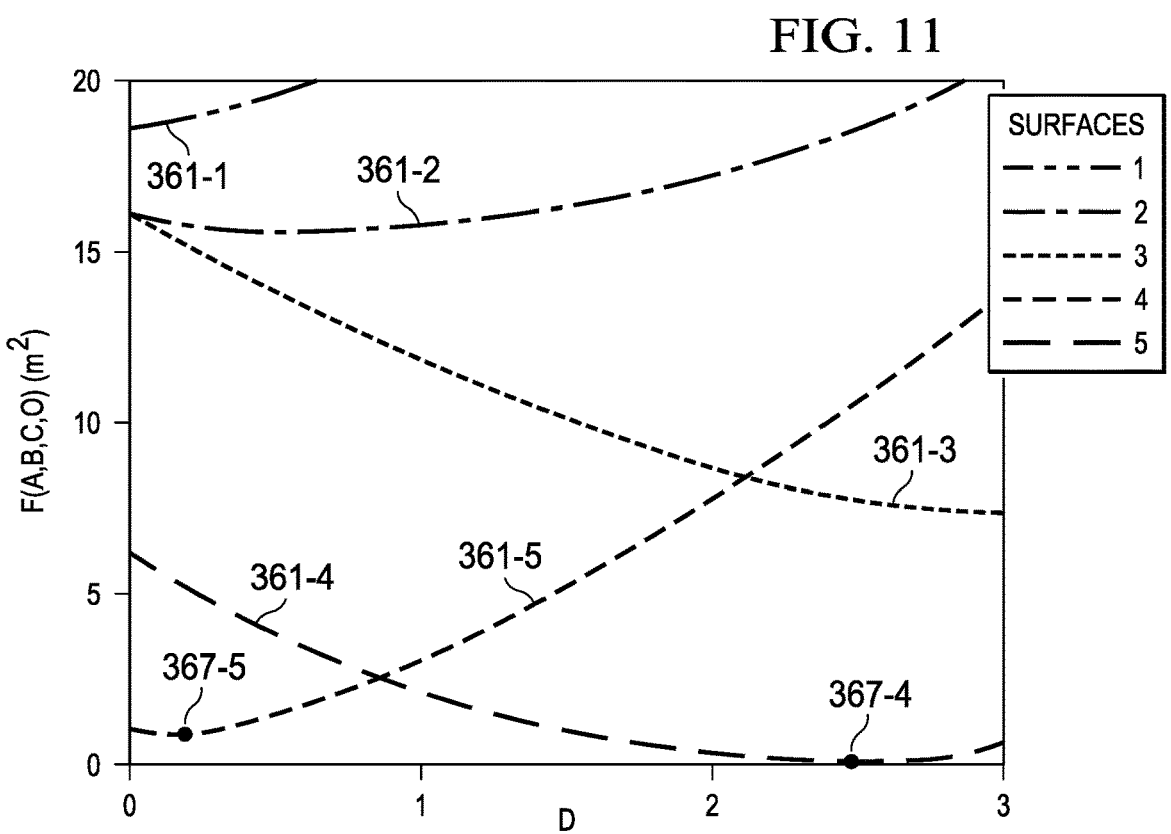
FIG. 11 illustrates fully-enumerated target function plots for the collision-eligible ray-reflecting surfaces of FIG. 10.

FIG. 11 illustrates fully enumerated target function plots 361-1 through 361-5. Each fully enumerated target function plot 361 corresponds to one of five collision-eligible surfaces and indicates the applicable surface's target function value for each incremental distance of the applicable ray. Comparing FIG. 10 and FIG. 11, it can be seen that the surface identified as the most likely collision surface based on the initial target function slopes, i.e., the surface associated with target function plot 351-5 in FIG. 10, was not the actual collision surface. Instead, as illustrated in FIG. 11, the surface associated with fully enumerated target function plot 361-4 is identified as the collision surface. Specifically, although the surface associated with fully enumerated target function plot 361-5 was the first surface evaluated as the collision surface based on the initial slope of target function plot 351-5 (FIG. 10) and the estimated collision distance D0 (FIG. 10), the propagation ray passed by, rather than collided with, this surface, as evidenced by its positive value of Fmin 367-5. The surface associated with fully enumerated target function plot 361-4 was subsequent identified as the actual collision surface when the Fmin value (367-4) for target function plot 361-4 was found to be zero.

FIG. 12 through FIG. 15 illustrate four different embodiments of surface filtering block 162 (FIG. 6) for reducing the number of collision-eligible surfaces prior to performing surface selection block 164 (FIG. 6 and FIG. 9). Although each embodiment is illustrated in two-dimensional space for the sake of clarity and simplicity, disclosed methods may filter collision-ineligible surfaces in three dimensions. In addition, although FIG. 12 through FIG. 15 illustrate each embodiment in graphical form using Cartesian coordinates, other embodiments may employ different coordinate systems.

Figure 12:
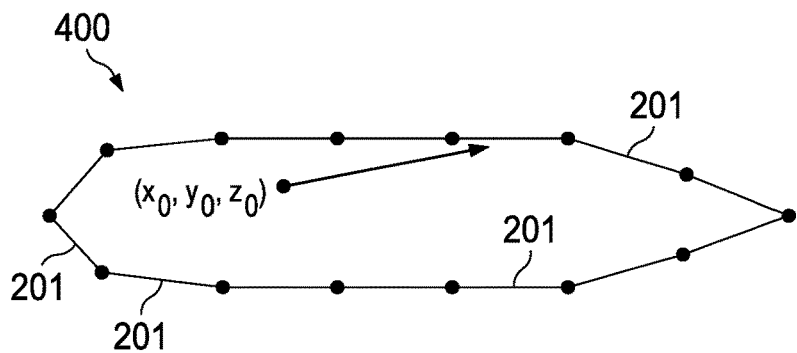
FIG. 12 illustrates a first ray-filtering option in which all surfaces are treated as collision-eligible surfaces.

In FIG. 12 through FIG. 15, (x0, y0, z0) is the original position of a propagation ray. FIG. 12 illustrates an example in which no filtering of surfaces 201 is performed and all surfaces 201 are considered collision-eligible surfaces that must be processed via surface selection block 164 (FIG. 6, FIG. 9).

Figure 13:
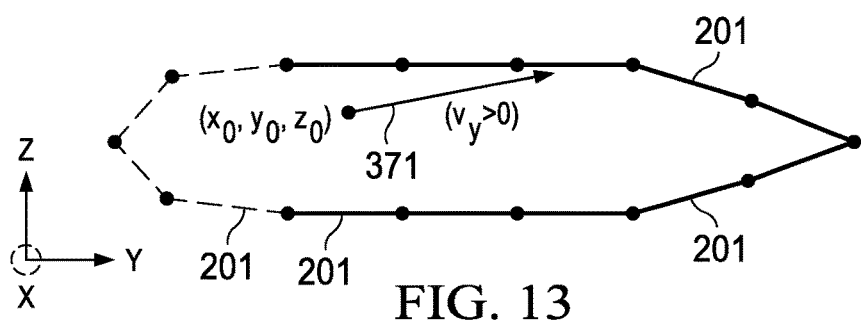
FIG. 13 illustrates a second ray-filtering option in which some surfaces are filtered.
Figure 14:
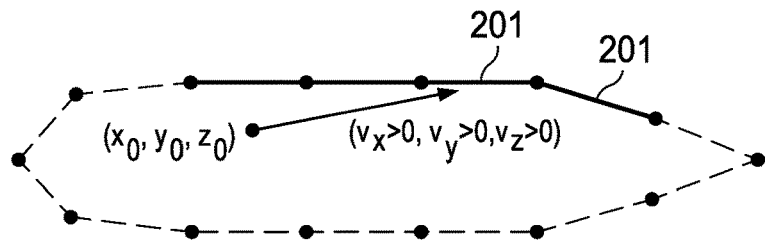
FIG. 14 illustrates a third ray-filtering option in which more surfaces are filtered than in FIG. 13.

FIG. 13 and FIG. 14 illustrate surface filtering examples in which a surface 201 is identified as either a collision-eligible surface or a collision-ineligible surface with respect to the propagation ray based on the propagation ray's velocity vector 371 and a displacement vector (not illustrated explicitly), where the displacement vector indicates the position of the applicable surface 201 relative to the propagation ray's initial position (x0, y0, z0). In at least one embodiment, a surface 201 is identified as a collision-eligible surface if the coordinates of the displacement vector and the coordinates of velocity vector 371 have the same sign. If, as an example, the velocity vector 371 for a particular propagation ray has a positive y-coordinate value, any surface 201 positioned wherein the displacement vector has a negative y-coordinate value is a collision-ineligible surface because the propagation ray is moving away from the surface in the y-direction. This example is illustrated in FIG. 13, wherein the propagation ray has an initial position (x0, y0, z0) and a velocity vector 371 with a positive y-coordinate value. The positive y-coordinate value of velocity vector 371 renders all surfaces positioned in a "negative y direction" with respect to initial position (x0, y0, z0), collision-ineligible. Collision-ineligible surfaces 373 are illustrated in FIG. 13 with dashed lines.

The filtering of surfaces described in the preceding example can be expanded to filter surfaces based on any two of the three coordinates or based on all three coordinates. FIG. 14 illustrates an example of y-z filtering, i.e., filtering based on a combination of the y-coordinate and the z-coordinate. The velocity vector 371 has a positive value y-coordinate and a positive value z-coordinate. Therefore, any surface positioned wherein its displacement vector has a negative value y-coordinate or a negative value z-coordinate is collision-ineligible. Collision ineligible surfaces 375 are illustrated in FIG. 14 with dashed lines.

The coordinates of the three points defining each surface have maximum and minimum values in the x, y, and z planes and the filtering illustrated in FIG. 13 and FIG. 14 may be based on displacement vectors that reflect these maximum and/or minimum values, depending upon the value of the velocity vector coordinates. Using the example of FIG. 13 to illustrate, the y-coordinate is the coordinate of interest for filtering purposes and the velocity vector 371 has a positive value y-coordinate. To filter only those surfaces that have zero probability of being the collision surface, the displacement vector may be defined in accordance with the surface's maximum y-coordinate value (ymax). If the ymax displacement vector has a negative value y-coordinate, then the entire surface is negatively positioned in the y-direction with respect to the propagation ray's initial position (x0, y0, z0) and, because the propagation ray is moving in a positive y direction, the propagation ray cannot collide with the surface and the surface can therefore be designated as collision-ineligible. By analogy, displacement vectors defined based on the maximum x-coordinate value, xmax, the maximum y-coordinate value, ymax, and the maximum z-coordinate value, zmax, may be used in the filtering of FIG. 14.

Figure 15:
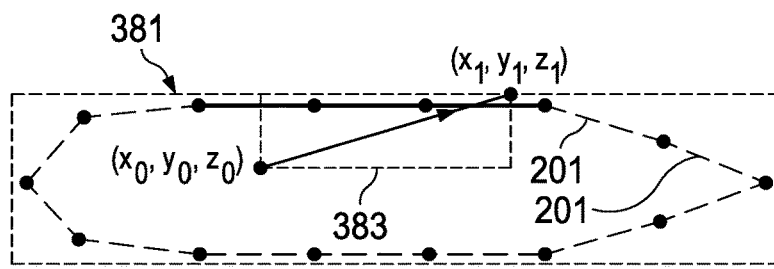
FIG. 15 illustrates a fourth ray-filtering option, in which more surfaces are filtered than in FIG. 14.
Figure 16:
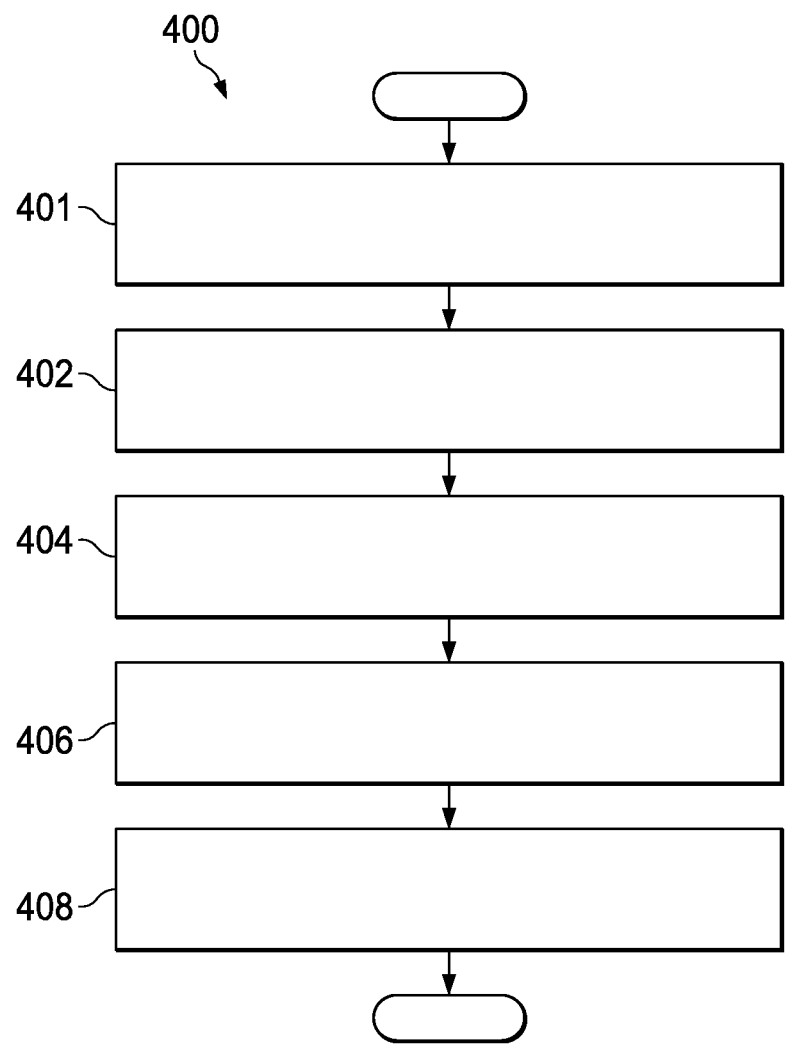
FIG. 16 illustrates a flow diagram of a method for implementing the fourth ray-filtering option embodiment illustrated in FIG. 15.

FIG. 15 illustrates surface filtering in accordance with a filtering method 400 depicted in the flow diagram of FIG. 16.

The flow diagram blocks illustrated in FIG. 16, correspond to various operations described herein and include a loading block (block 401) for loading all collision eligible surfaces, a construction block (block 402) for constructing a first virtual box, a block (block 404) for determining a point at which a vector associated with the propagation ray intersects the first virtual block, a construction block (block 406) for constructing a second virtual block, and a block (block 408) for identifying surfaces within the second virtual block as collision-eligible surfaces.

The filtering method 400 illustrated in FIG. 16 includes loading all surfaces (block 401) and constructing (block 402) a first virtual box 381 of a size that is just sufficient to enclose all surfaces or slightly bigger. In at least one embodiment, first virtual box 381 is a parallelepiped defined by the xmin, xmax, ymin, ymax, zmin, and zmax planes where xmin is the minimum x-coordinate value of all surfaces, xmax is the maximum x-coordinate value of all surfaces, and so forth. The propagation ray's velocity vector 371 is then linearly extrapolated, starting from the propagation ray's initial position at (x0, y0, z0), to calculate or otherwise determine (block 404) an intersection point (x1, y1, z1) where velocity vector 371 intersects first virtual box 381.

A second virtual box 383 is then constructed (block 406) using the propagation ray's original position (x0, y0, z0) and the intersection point (x1, y1, z1) as opposing corners of the second virtual box. Surfaces 201 may then be identified (block 408) as collision-eligible or collision-ineligible based on their respective positions relative to second virtual box 383. Surfaces 201 that are entirely exterior to second virtual box 383 may be identified as collision-ineligible surfaces.

Table 1 below indicates exemplary times for processing a leaky antenna array using each of the four surface-filtering options illustrated in FIG. 12 through FIG. 15, where Option 1 refers to the surface-filtering embodiment of FIG. 12, Option 2 refers to the surface-filtering embodiment of FIG. 13, Option 3 refers to the surface-filtering embodiment of FIG. 14, and Option 4 refers to the surface-filtering embodiment of FIG. 15. A ray tracing model that included 12,000 propagation rays per antenna slot was used for each of the four filter surfacing options. While all four options identified the same set of collision surfaces and produced substantially the same signal power distributions, the time required to process the antenna array differed significantly among the four options. For the case of 6720 surfaces, Option 2 required less than 50% of the time required to process the antenna array via Option 1, while Option 3 required just 35% of the processing time required by Option 2, and Option 4 required just over 20% of the processing time required by Option 3.

TABLE 1

| No. of Surfaces | Option 1 | Option 2 | Option 3 | Option 4 |
|---|---|---|---|---|
| 6720 (includes furniture) | 280 mins | 120 mins | 42 mins | 9 mins |
| 3210 (no furniture) | 72 mins | 48 mins | 20 mins | 6 mins |

Figure 17:
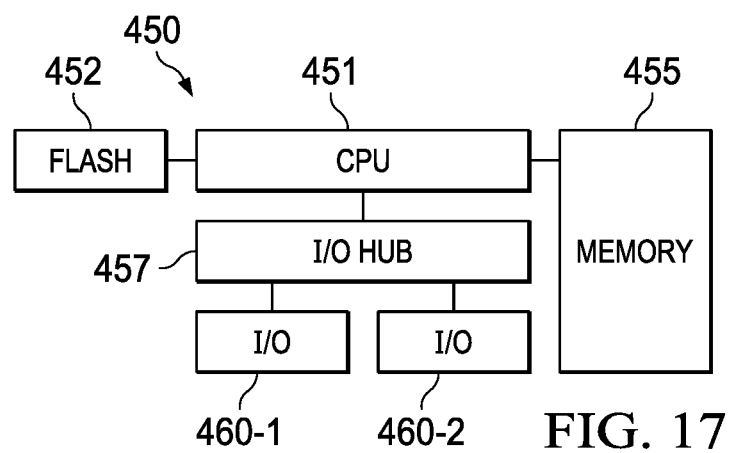
FIG. 17 illustrates elements of a general purpose computer programmed to perform disclosed operations.

FIG. 17 illustrates a computer or computer system suitable for performing the operations for determining a signal power distribution described herein. The computer system 450 illustrated in FIG. 17 includes a CPU 451 coupled to a flash storage device 452 to store, for example, basic I/O system (BIOS) code or the like. The CPU 451 is further illustrated coupled to memory 455. Memory 455 may include CPU-executable program instructions, that, when executed by CPU 451, cause system 450 to perform one or more of the operations disclosed herein including operations disclosed with respect to the flow diagrams of FIG. 6, FIG. 9, and FIG. 16. CPU 451 is further illustrated coupled to one or more I/O devices 460-1 and 460-2 through a chipset device identified as I/O Hub 457. I/O devices 460 may include, as examples, wireless and/or wireline network interface devices enabling system 450 to communicate with other systems via the Internet or one or more private networks.

The invention has been described in the context of advantageous and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicant, but rather, in conformity with the patent laws, Applicant intends to protect fully all such modifications and improvements that come within the scope or range of equivalents of the following claims.

What is claimed is:

1. A method of quantifying a power distribution for a wireless communication signal within a constrained environment, wherein the method comprises:
   performing first operations for each of one or more antenna slots of a leaky antenna disposed within a constrained environment, wherein the first operations include:
      performing surface selection operations for each propagation ray in a ray tracing model of each antenna slot, wherein the ray tracing model includes a plurality of propagation rays, wherein the surface selection operations include:
         screening one or more ray-reflecting surfaces with respect the propagation ray to identify collision-ineligible surfaces and collision-eligible surfaces;
         identifying a collision surface from the collision-eligible surfaces, wherein the collision surface comprises a first ray-reflecting surface with which the propagation ray collides;
         adding a power distribution component corresponding to the propagation ray to a power distribution data structure;
         calculating a reflected ray resulting from the propagation ray colliding with the collision surface; and
         responsive to determining that the reflected ray satisfies each of one or more ray eligibility conditions, performing the collision surface operations for the reflected ray.

2. The method of claim 1, wherein screening a ray-reflecting surface includes identifying the ray-reflecting surface as either a collision-eligible surface or a collision-ineligible surface based on:
   an original position of the propagation ray;
   a direction of motion of the propagation ray; and
   a surface displacement indicative of a position of the ray-reflecting surface relative to the original position of the propagation ray.

3. The method of claim 2, identifying a ray-reflecting surface as either a collision-eligible or a collision-ineligible surface includes comparing one or more coordinates of a velocity vector for the propagation ray to a corresponding one or more coordinates of the displacement vector for the ray-reflecting surface.

4. The method of claim 3, further comprising:
   responsive to detecting, based on said comparing, sign consistency between each of the one or more coordinates of the velocity vector and its corresponding one or more coordinates of the displacement vector, identifying the ray-reflecting surface as a collision-eligible surface.

5. The method of claim 1, wherein screening includes defining an eligible surfaces volume based on an initial position of the propagation ray and an enclosing volume wherein the enclosing volume is of a size sufficient to enclose the enclosed environment.

6. The method of claim 5, wherein the eligible surfaces volume comprises a cuboid and wherein a diagonal of the cuboid extends from the initial position of the propagation ray to an intersection point, wherein the intersection point comprises a point at an intersection of the propagation ray and the enclosing volume.

7. The method of claim 1, wherein identifying the collision surface comprises identifying the collision surface using a target function, wherein the target function determines a target function value indicative of a displacement between a position of the propagation ray and a ray-reflecting surface.

8. The method of claim 7, wherein the target function value is zero when displacement between the propagation ray and the ray-reflecting surface is zero and wherein the target function value increases monotonically with increasing displacement.

9. The method of claim 8, wherein:
   the ray-reflecting surface corresponds to a triangle ABC defined by points A, B, and C;
   the position of the propagation ray comprises a point O; and
   the target function evaluates to (S1+S2+S3)−S0 wherein:
      S0 represents an area of triangle ABC
      S1 represents an area of a triangle OAB defined by points O, A, and B;
      S2 represents an area of a triangle OBC defined by points O, B, and C; and
      S3 represents an area of a triangle OCA defined by points O, C, and A.

10. The method of claim 9, wherein identifying the collision surface includes:
    calculating initial slopes of target function plots for each collision-eligible surface, wherein each target function plot comprises a plot of target function values versus propagation ray positions;
    identifying ray-reflecting surfaces associated with positive value initial slopes as collision-ineligible surfaces;
    for each collision-eligible surface remaining after said identifying:
       extrapolating each target function plot in accordance with its initial slope to identify a projected distance value for each collision-eligible surface;
       ordering the collision-eligible surfaces in accordance with the projected distance values;
       processing the collision-eligible surfaces in accordance with the ordering, wherein processing a collision-eligible surface includes:
          calculating a minimum target function value for the collision-eligible surface;
          responsive to detecting a minimum target function value greater than zero, identifying the surface as a collision-ineligible surface; and
          responsive to detecting a minimum target function value of zero, identifying the surface as the collision surface.

11. A system comprising:
    a central processing unit;
    a non-transitory computer readable memory including processor executable program instructions that, when executed cause the CPU to perform operations comprising:
       performing first operations for each of one or more leaky antenna slots disposed in a leaky antenna array disposed within a constrained environment, wherein the first operations include:
performing first operations for each of one or more antenna slots of a leaky antenna disposed within a constrained environment, wherein the first operations include:
performing surface selection operations for each propagation ray in a ray tracing model of each antenna slot, wherein the ray tracing model includes a plurality of propagation rays, wherein the surface selection operations include:
screening one or more ray-reflecting surfaces with respect the propagation ray to identify collision-ineligible surfaces and collision-eligible surfaces;
identifying a collision surface from the collision-eligible surfaces, wherein the collision surface comprises a first ray-reflecting surface with which the propagation ray collides;
adding a power distribution component corresponding to the propagation ray to a cumulative power distribution;
calculating a reflected ray resulting from the propagation ray colliding with the collision surface; and
responsive to determining that the reflected ray satisfies each of one or more ray eligibility conditions, performing the collision surface operations for the reflected ray.

12. The system of claim 11, wherein screening a ray-reflecting surface includes identifying the ray-reflecting surface as either a collision-eligible surface or a collision-ineligible surface based on:
an original position of the propagation ray;
a direction of motion of the propagation ray; and
a surface displacement indicative of a position of the ray-reflecting surface relative to the original position of the propagation ray.

13. The system of claim 12, wherein the operations include:
identifying a ray-reflecting surface as either a collision-eligible or a collision-ineligible surface includes comparing one or more coordinates of a velocity vector for the propagation ray to a corresponding one or more coordinates of the displacement vector for the ray-reflecting surface.

14. The system of claim 13, wherein the operations include:
responsive to detecting, based on said comparing, sign consistency between each of the one or more coordinates of the velocity vector and its corresponding one or more coordinates of the displacement vector, identifying the ray-reflecting surface as a collision-eligible surface.

15. The system of claim 11, wherein screening includes defining an eligible surfaces volume based on an initial position of the propagation ray and an enclosing volume wherein the enclosing volume is of a size just sufficient to enclose the enclosed environment.

16. The system of claim 15, wherein the eligible surfaces volume comprises a cuboid and wherein a diagonal of the cuboid extends from the initial position of the propagation ray to an intersection point, wherein the intersection point comprises a point at an intersection of the propagation ray and the enclosing volume.

17. The system of claim 11, wherein identifying the collision surface comprises identifying the collision surface using a target function, wherein the target function determines a target function value indicative of a displacement between a position of the propagation ray and a ray-reflecting surface.

18. The system of claim 17, wherein the target function value is zero when displacement between the propagation ray and the ray-reflecting surface is zero and wherein the target function value increases monotonically with increasing displacement.

19. The system of claim 18, wherein:
the ray-reflecting surface corresponds to a triangle ABC defined by points A, B, and C;
the position of the propagation ray comprises a point O; and
the target function evaluates to (S1+S2+S3)−S0 wherein:
S0 represents an area of triangle ABC
S1 represents an area of a triangle OAB defined by points O, A, and B;
S2 represents an area of a triangle OBC defined by points O, B, and C; and
S3 represents an area of a triangle OCA defined by points O, C, and A.

20. The system of claim 19, wherein identifying the collision surface includes:
calculating initial slopes of target function plots for each collision-eligible surface, wherein each target function plot comprises a plot of target function values versus propagation ray positions;
identifying ray-reflecting surfaces associated with positive value initial slopes as collision-ineligible surfaces;
for each collision-eligible surface remaining after said identifying:
extrapolating each target function plot in accordance with its initial slope to identify a projected distance value for each collision-eligible surface;
ordering the collision-eligible surfaces in accordance with the projected distance values;
processing the collision-eligible surfaces in accordance with the ordering, wherein processing a collision-eligible surface includes:
calculating a minimum target function value for the collision-eligible surface;
responsive to detecting a minimum target function value greater than zero, identifying the surface as a collision-ineligible surface; and
responsive to detecting a minimum target function value of zero, identifying the surface as the collision surface.

* * * * *